Dec. 12, 1944.  LA VERNE B. RAGSDALE  2,364,658
ENGINE
Filed Aug. 5, 1942  3 Sheets-Sheet 3

INVENTOR
La Verne B. Ragsdale.
BY
ATTORNEYS.

Patented Dec. 12, 1944

2,364,658

UNITED STATES PATENT OFFICE 2,364,658

ENGINE

La Verne B. Ragsdale, Detroit, Mich., assignor to Briggs Manufacturing Company, Detroit, Mich., a corporation of Michigan Application August 5, 1942, Serial No. 453,688

30 Claims. (Cl. 123—80)

This invention relates to internal combustion engines and particularly to engines of the type having a rotatable valve in the head thereof.

The present invention has particular application to an internal combustion engine of the kind in which the rotatable valve in the head, preferably although not necessarily of the kind which rotates continuously in one direction, is formed with substantially all or at least the major portion of the combustion chamber and is generally conical or frusto-conical in shape.

In the preferred embodiment of the invention the combustion chamber in the valve has an opening or port in the side of the valve adapted to communicate with an intake or exhaust passage, or both as the case may be, and also an opening at the inner end or bottom of the valve leading to the cylinder. With the exception of the ports in the side and bottom of the rotor which afford communication between the combustion chamber, cylinder and intake or exhaust passage or passages, the combustion chamber is otherwise entirely enclosed or housed within the valve member or rotor. The combustible charge within the combustion chamber is fired preferably by spark ignition although in its broader aspects the invention is not considered to be so limited.

Heretofore, in the development of engines of the rotatable valve type, it has been considered desirable to use a valve of the frusto-conical type with the large end of the valve adjacent to and facing the outer end of the cylinder, this construction having the advantage of permitting the valve driving and supporting mechanism to be operatively connected to the valve stem extending from the smaller end of the valve.

In many previous structures the bottom of the valve or rotor facing the outer open end of the cylinder has been made with a diameter at least as great or greater than the diameter of the cylinder bore and substantially the entire bottom surface of the valve member around the opening into the cylinder has been exposed to the full explosion force or pressure. Serious difficulties and problems have been encountered in obtaining sustained efficient operation of an engine of commercial size constructed in this manner. Thus, there has been encountered such problems as that of lubricating the rotary valve, the problem of providing adequate and sufficient bearings for the valve in order to prevent seizing, scoring and undue friction during operation, and the problem of sealing the combustion chamber against leakage of gases and consequent power loss during the power and compression strokes of the piston.

The foregoing problems have been rendered difficult of solution because of variations in pressures or forces acting upon the valve during the engine cycle. One major difficulty has arisen by reason of the effect of the explosion force or pressure in driving the cone-type valve member not only outwardly but also laterally, thereby causing a severe wedging action or thrust of the valve against its seat and tending to seriously impair the oil film between the surfaces of the valve and its bearing seat in the cylinder head, resulting in seizing and scoring of the valve member.

An object of the present invention is to improve the construction of the engine so that even longer sustained periods of operation may be achieved and in which the rotor may be balanced within its cavity in the cylinder head more effectively and to better advantage, thereby effecting still greater improvements in operation not only by increasing the power output and the life of the valve but also decreasing oil consumption.

A further object of the invention is to provide an improved internal combustion engine of the type utilizing a frusto-conical valve containing the major portion of the combustion space and in which the position of the rotor within the cylinder head is more effectively controlled, thereby avoiding scoring and seizing of the valve, and in which the power output is increased by reducing leakage of gases around the intake and exhaust ports.

Still another object of the invention is to simplify the bearing for the valve or rotor within the cylinder head, eliminating complicated thrust bearing arrangements, complicated adjustment devices therefor, reducing weight, saving space, increasing the performance life of the engine, and permitting the use of less expensive metals in the fabrication of the rotor valve and the cylinder head.

A further object of the invention is to increase the performance life of the valve and improve the operation thereof by providing in effect a double valve or rotor construction, the inner valve member containing the combustion chamber and being generally frusto-conical with its narrow end adjacent the cylinder, and the outer valve member being generally frusto-conical with its wide end adjacent the inner valve member, the two valve members being drivingly connected and having tapered bearing faces coacting with bearing surfaces in the cylinder head, provision being made to urge the valve members apart by pressure introduced therebetween from the combustion chamber at the time of explosion.

Still another object of the invention is to provide an engine having a double rotatable valve, preferably of the generally frusto-conical type, which in effect comprises two valve members drivingly interconnected, pressure or other means being provided to urge the members apart against their respective bearing surfaces at the time of explosion.

Other objects of this invention will appear in the following description and appended claims, reference being had to the accompanying drawings forming a part of this specification wherein like reference characters designate corresponding parts in the several views.

Figure 1:
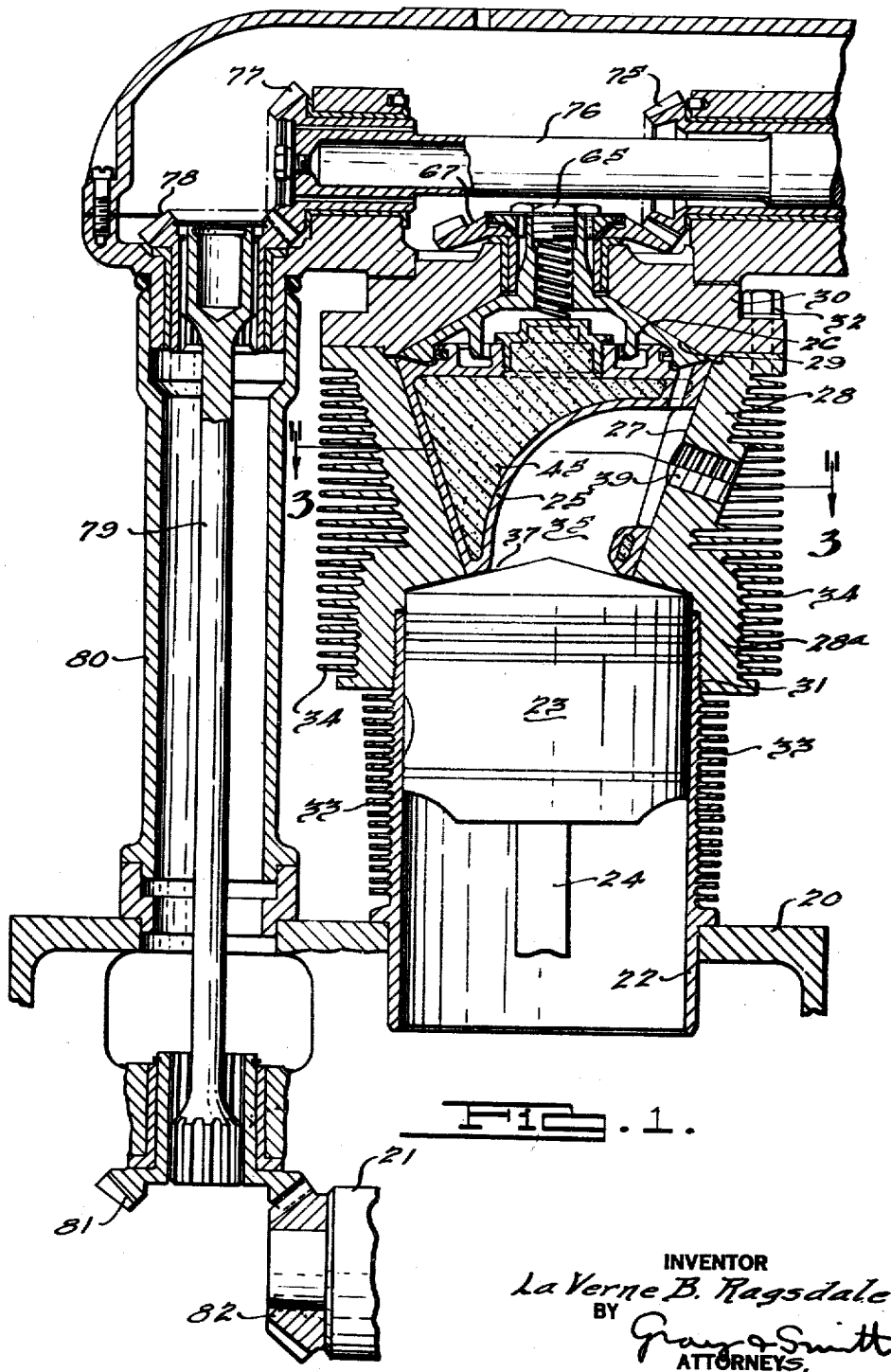
Fig. 1 is a fragmentary sectional elevation illustrating a portion of a multi-cylinder engine embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention as applied to an internal combustion engine of the spark ignition type designed particularly for the power plant of an aircraft. The invention may obviously be embodied in engines for other purposes, such as automotive, marine and industrial engines. For most uses the engine is of the multi-cylinder type, although any number of cylinder units may be employed in any given engine. In the present embodiment, for the purposes of simplicity, a single cylinder unit of the engine is illustrated, it being understood that the remaining cylinders of the engine are identical to the structure herein shown and described.

Referring to Fig. 1, the present engine comprises a suitable crankcase 20 within which is mounted a crankshaft 21 supported in bearings according to conventional practice. A cylinder 22 is secured rigidly to the crankcase and has its lower or inner end projecting thereinto. Mounted to reciprocate within the cylinder is a piston 23 adapted to be connected in the usual manner by a connecting rod 24 to the crankshaft 21.

In the present engine the valve rotor comprises two valve parts, namely, a lower or inner valve member 25 and an upper or outer valve member 26, these valve members being drivingly connected together with pressure means being provided for the purpose of urging the members apart at the time of explosion, as hereinafter described. The combustion chamber of the cylinder is formed principally within the inner rotor is formed principally within the inner rotor member 25, this member comprising a frusto-conical body arranged immediately above the piston 23 when at the top of its stroke. The rotor 25 fits within a correspondingly shaped substantially frusto-conical cavity 27 in an intermediate cylinder head member 28. It will be seen that the frusto-conical valve body 25 is inserted so that the narrow end thereof is adverted so that the narrow end thereof is adjacent the outer end of the cylinder 22 and the outer wide end of the valve body faces the outer valve member 26. The valve member 26 is also of generally frusto-conical shape fitting within a correspondingly shaped cavity 29 in an outer cylinder head member 30. The bottom or wider end of the valve member 26 corresponds in diameter to the top or wider end of the valve member 25. Thus, the tapering side wall of the valve member 25 bears against the cavity 27 having a downwardly and inwardly tapering wall, whereas the correspondingly tapered walls of the upper valve member 26 and the cavity 29 extend downwardly and outwardly.

The cylinder head member 28 has an annular portion 28a which overlaps the upper end of the cylinder 22 and is attached thereto by threads 31. The upper cylinder head 30 is rigidly secured to the cylinder head member 28 by bolts 32.

The present engine is illustrated as being air-cooled and, accordingly, the cylinder 22 is provided with projecting fins 33. Cooling fins 34 are also provided on the intermediate cylinder head member 28. It will be understood that the present invention is not limited to an air-cooled engine as it will be apparent that any effective cooling system may be utilized.

Figure 2:
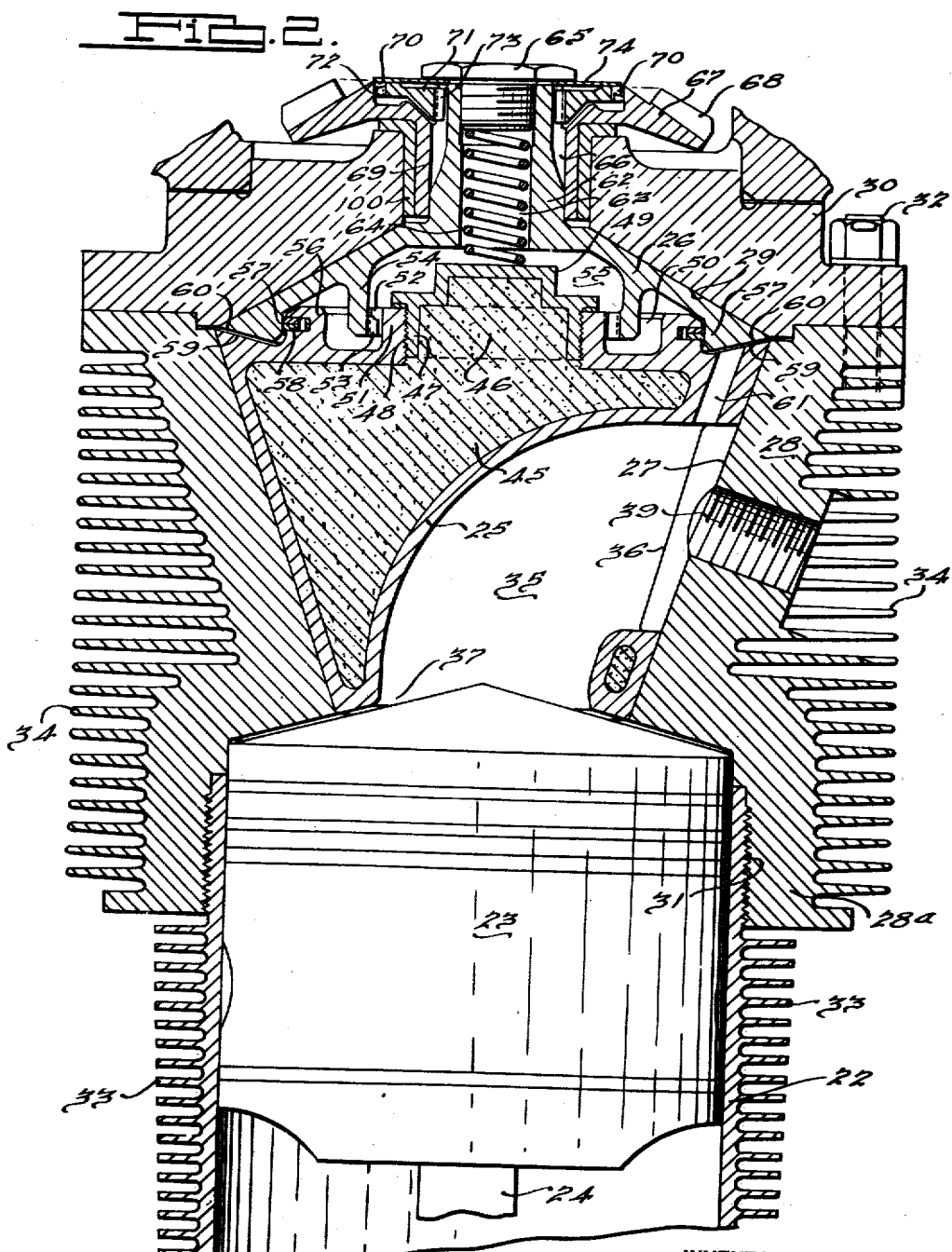
Fig. 2 is an enlarged fragmentary sectional elevation illustrating particularly the associated cylinder head and rotary valve structure shown in Fig. 1.
Figure 3:
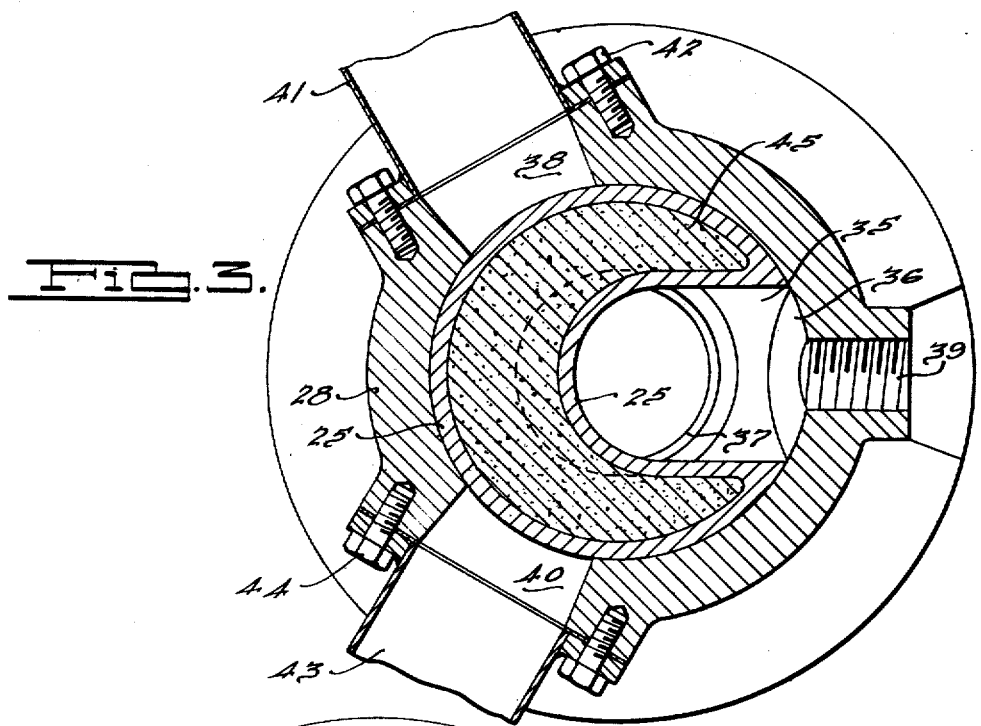
Fig. 3 is an enlarged section taken substantially through lines 3—3 of Fig. 1 looking in the direction of the arrows.
Figure 4:
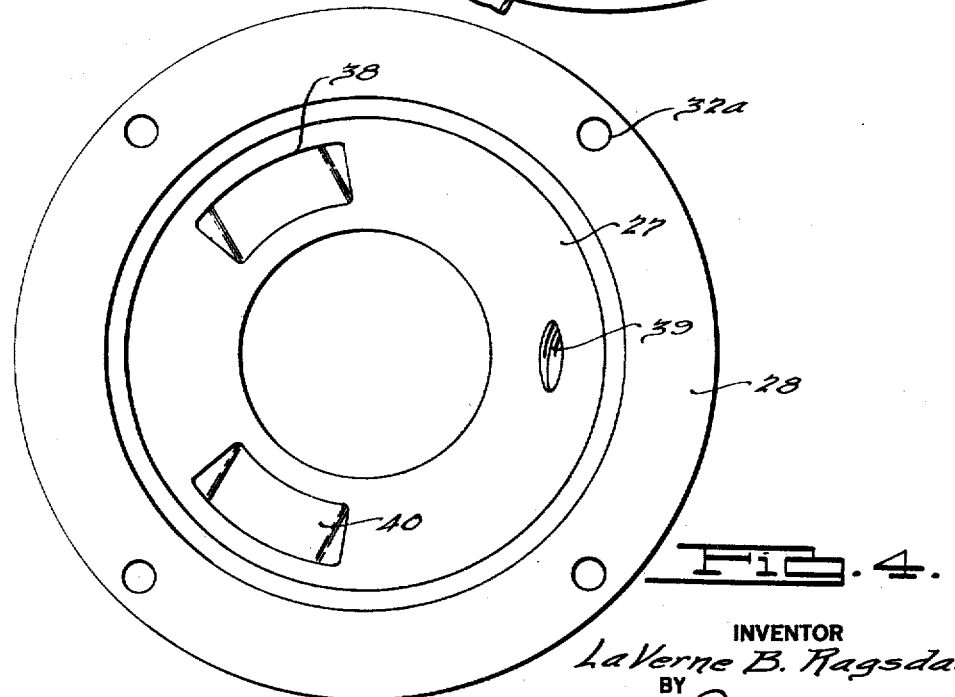
Fig. 4 is a plan view of the intermediate cylinder head member looking towards the cylinder and with the rotary valve removed.

The rotary valve member 25 is formed with a curved wall chamber 35 which constitutes substantially the entire combustion space when the piston 23 is in the position of maximum compression as illustrated in Fig. 2. The chamber 35 is provided at one side with a port 36 and at its inner end with a centrally located port or opening 37 leading into the cylinder 22. The port 36 in the side wall of the valve member 25 is adapted to register successively with an intake passage 38, a spark plug at threaded opening 39, and an exhaust passage 40 all located at proper positions in the cylinder head member 28. The intake passage 38 in the cylinder head is connected to an intake conduit 41 which is attached to the cylinder head by screws 42. The exhaust passage 40 in the cylinder head communicates with an exhaust conduit 43 attached to the cylinder head by screws 44. The valve member 25 is chambered to provide a cavity 45 extending entirely around the combustion chamber 35 and in preferred practice this cooling chamber is filled, or partially so, with a suitable heat conducting medium such as metallic sodium. The upper end of the valve member 25 has a threaded hole adapted to be closed by means of a hollow plug 46. This plug has an annular wall 47 provided with threads 48 for attachment to the valve member and has at its top an upwardly extending hollow embossment 49.

The top wall of the valve member 25 is provided with an annular groove or channel 50 and which forms a vertical annular flange 51 and this flange is provided with external teeth or splines 52 which cooperate with similar teeth or splines 53 on a depending annular flange 54 integral with the outer valve member 26. The flange 54 extends into the recess 50, as illustrated in Fig. 2, and since the teeth or splines 52 and 53 are in mesh at all times it will be seen that the valve members 25 and 26 are thereby drivingly connected together. The valve member 26 is recessed at 55 adjacent the flange 54 so as to provide clearance for the plug 46. The recess 50 in the top of the valve member 25 forms an annular flange 56 which fits against and within an annular wall 57 of the upper valve member 26. The flange 56 is grooved to receive expansion rings 58 which engage the surface of the wall portion 57 and provide a seal against any leakage of gases past the rings 58 into the space above these rings between the valve members 25 and 26.

Outwardly of the expansion sealing rings 58 the valve member 25 has an annular inclined top surface 59 which is juxtaposed to a correspondingly shaped bottom surface 60 of the valve member 26. These surfaces 59 and 60 have an operating or running clearance therebetween and are normally out of contact during operation of the engine. A small duct or passage 61 extends from the combustion chamber 35 through the top wall of the valve member 25 into the space between the surfaces 59 and 60. In the present instance one connecting duct 61 is provided between the combustion chamber and the space between the surfaces 59 and 60 of the valve members. However, a plurality of ducts may be provided as may be desired. The size or diameter of this duct 61 is predetermined so that at the time of firing the proper amount of pressure will be transmitted from the combustion chamber to the space between the surfaces 59 and 60, thereby exerting a force tending to separate or spread the valve members apart.

The upper or outer valve member 26 is formed with an integrally projecting stem 62 which has a central hole 63 therethrough to receive a compression spring 64. This spring is of suitable strength and is held under the proper degree of compression by means of a nut 65 which is threaded into a tapped counterbore of the hole or bore 63. Thus, the spring 64 is at all times loaded and exerts a calculated or predetermined downward force against the embossment 49, thereby tending to force the valve member 25 downwardly against the downwardly converging wall of the valve cavity 27.

The rotary valve, comprising the connected members 25 and 26, is driven through the medium of the stem 62 which is positively connected to a driving gear in such manner as to permit slight relative axial movement between the driving gear and the rotor 25, 26. It will be understood, of course, that the driving connection 52, 53 between the valve members 25 and 26 is such as to permit slight relative axial movement but not relative circumferential movement between these parts. The stem 62 of the rotor is provided with external longitudinal splines 66. The rotor is driven by a gear 67 having suitable gear teeth 68, this gear being formed with a depending cylindrical hub or sleeve 69 having a sliding fit over the stem 62 and rotatable within a bearing bushing 100. The gear 67 also has internal tooth-like splines 70. A coupling member 71 fits within the annular space formed between the teeth or splines 70 of the driving gear, this coupling member having exterior teeth or splines 72 fitting into the spaces between the splines 70 of the driving gear and also having internal splines 73 fitting within the spaces formed by the splines 66 of the stem 62. Interposed between the head of the clamping nut 65 and the gear 67 is a spring washer 74 which has a central aperture through which the shank of the clamping nut projects, the washer being of sufficient diameter to engage the upper face of the gear and thus yieldingly hold the gear and member 71 in driving positions.

Referring to Fig. 1, the gear 67, which is attached to the projecting stem 62 of the rotor member 26, is driven through the medium of a gear 75 attached to a top horizontal shaft 76. This shaft is of the desired length to permit simultaneous driving of the rotors of a plurality of cylinders arranged in line, or arranged in V-formation. Attached to the end of the shaft 76 is a gear 77 which is driven by a gear 78 secured to the upper end of a tower shaft 79 suitably mounted to extend through a vertical housing 80. Secured to the lower end of the tower shaft 79 is a gear 81 which is driven through the medium of a gear 82 attached to the crankshaft 21.

From the foregoing it will be seen that the rotary valve in the present engine comprises two generally frusto-conical members connected together for rotation as a single unit while permitting a slight amount of relative axial movement. It will be understood that during rotation of the valve member 25 the fuel mixture or charge will be taken into the cylinder when the port 36 registers with intake passage 38. Firing of the charge will occur when the valve port 36 reaches the spark plug location 39, the charge at this time being compressed substantially entirely within the chamber 35 with the piston in its position of maximum compression as illustrated in Fig. 2.

As the explosion occurs in the combustion chamber 35 and the burning of the fuel mixture proceeds, the resultant of the forces acting on the valve member 25 is a force acting or tending to displace the valve outwardly away from the cylinder. Since the valve members 25 and 26 are fitted within the cavities 27 and 29 with suitable operating clearances the normal effect of the explosion pressure is to force the members 25 and 26 outwardly, thereby causing member 25 to move away from the walls of the cavity 27. This normally would produce excessive clearance and destroy the seal between the valve member 25 and the cavity walls 27, and permit leakage of gases through passages 38 and 40 with consequent loss of power.

The foregoing, however, is obviated by providing the double cone valve and bleeding the pressure from the combustion chamber through duct 61 into the space between the juxtaposed surfaces 59 and 60. A downward force is thus applied to the valve member 25 offsetting and substantially neutralizing the outward force tending to unseat the valve member 25. At the same time an outward force is exerted upon wall 60 urging valve member 26 firmly against its conical or tapered bearing wall 29 thereby maintaining intact the oil film between these surfaces.

Since the opposed forces acting in a generally axial direction on valve member 25, due to explosion pressures, are substantially balanced, it will be seen that the valve member can substantially float within its cavity. However, proper sealing contact between the surfaces of member 25 and cavity 27 is maintained by the pressure of spring 64 acting against the valve member to keep it seated. The expansible sealing rings 58 seal off the spaces 50 and 55 from the bleed passage 61 while permitting the pressure introduced between valve members 25 and 26 through passage 61 to urge the valve members apart.

I claim:

1. In an internal combustion engine having a cylinder head, a rotatable valve in said head comprising two members drivingly connected together and separable in a direction axially of the valve, one of said members having a combustion chamber and a duct effecting communication between said chamber and the space between said members.

2. In an internal combustion engine having a cylinder head, a rotatable valve in said head comprising two members drivingly connected together and separable in a direction axially of the valve, one of said members having a combustion chamber and a duct effecting communication between walls of said chamber and the space between said members, said members being generally frusto-conical and having their larger ends juxtaposed.

3. In an internal combustion engine having a cylinder and a reciprocable piston therein, a cylinder head, a two part rotatable valve in said head, one part having a combustion chamber, and a communicating duct leading from said combustion chamber to the space between adjacent walls of the two parts of the valve.

4. In an internal combustion engine having a cylinder and a reciprocable piston therein, a cylinder head, a two part rotatable cone-type valve in said head, one part having a combustion chamber and a port opening axially into the cylinder, and a communicating duct leading from said combustion chamber to the space between adjacent walls of the two parts of the valve.

5. In an internal combustion engine having a cylinder and a cylinder head, a rotary valve comprising inner and outer valve members, the inner member having walls converging toward the cylinder and provided with a combustion chamber opening into the cylinder, and a duct effecting communication between said chamber and the space between said members.

6. In an internal combustion engine having a cylinder and a cylinder head, a rotary valve comprising inner and outer valve members, the inner member having walls converging toward the cylinder and provided with a combustion chamber opening into the cylinder, means for drivingly connecting said members together while permitting relative axial movement thereof, and a duct effecting communication between said chamber and the space between said members.

7. In an internal combustion engine having a cylinder and a cylinder head, a rotary valve comprising inner and outer valve members, the inner member having walls converging toward the cylinder and provided with a combustion chamber opening into the cylinder, a duct effecting communication between said chamber and the space between said members, and yielding means for urging the inner valve member toward the cylinder independently of the outer member.

8. In an internal combustion engine having a cylinder and a cylinder head, a rotary valve comprising inner and outer valve members, the inner member having walls converging toward the cylinder and provided with a combustion chamber opening into the cylinder, means for drivingly connecting said members together while permitting relative axial movement thereof, a duct effecting communication between said chamber and the space between said members, and yielding means for urging the inner valve member toward the cylinder independently of the outer member.

9. In an internal combustion engine having a cylinder and a cylinder head, a rotary valve comprising inner and outer valve members, the inner member having walls converging toward the cylinder and provided with a combustion chamber opening into the cylinder, the outer member having walls diverging toward the cylinder, means for drivingly connecting said members together while permitting relative axial movement thereof, and means for transmitting pressure from the combustion chamber to the adjacent face of said outer valve member.

10. In an internal combustion engine having a cylinder and a cylinder head, a rotary valve comprising inner and outer valve members, the inner member having walls converging toward the cylinder and provided with a combustion chamber opening into the cylinder, the outer member having walls diverging toward the cylinder, means for drivingly connecting said members together while permitting relative axial movement thereof, means for transmitting pressure from the combustion chamber to the bottom of said outer valve member, and yielding means for urging the inner valve member toward the cylinder independently of the outer member.

11. In an internal combustion engine having a cylinder, a pair of drivingly connected generally frusto-conical rotary valve members mounted for relative axial movement arranged face to face but reversely with respect to each other, one member having a combustion space, and means for transmitting pressure from said space to the adjacent face of the other member.

12. In an internal combustion engine having a cylinder, a rotatable valve having a combustion chamber opening into the cylinder and being generally frusto-conical with its sides converging toward the cylinder, a driving member for said valve movably axially with respect thereto, and means for introducing pressure from the combustion chamber to the space between said valve and driving member.

13. In an internal combustion engine having a cylinder, a rotatable valve having a combustion chamber opening into the cylinder and being generally frusto-conical with its sides converging toward the cylinder, yielding means for urging said valve toward the cylinder, a driving member for said valve movably axially with respect thereto, and means for introducing pressure from the combustion chamber to the space between said valve and driving member.

14. In an internal combustion engine having a cylinder, a rotatable valve having a combustion chamber opening into the cylinder and being generally frusto-conical with its sides converging toward the cylinder, a generally frusto-conical driving member for said valve movable axially with respect thereto, and means for introducing pressure from the combustion chamber to the space between said valve and driving member.

15. In an internal combustion engine having a cylinder and a cylinder head, a valve member having tapering side walls converging toward the cylinder and rotatable within a seat formed by a correspondingly shaped cavity in said head, said member having a combustion chamber opening into the cylinder, a valve driving member positioned at the outer end of the valve and having tapering side walls diverging toward the cylinder and rotatable within a correspondingly shaped cavity in said head, said members having juxtaposed faces, a pressure passage leading from the combustion chamber to the space between said faces, and means for drivingly connecting said members while permitting relative axial movement thereof.

16. In an internal combustion engine having a cylinder and a cylinder head, a valve member having tapering side walls converging toward the cylinder and rotatable within a seat formed by a correspondingly shaped cavity in said head, said member having a combustion chamber opening into the cylinder, a valve driving member positioned at the outer end of the valve and having tapering side walls diverging toward the cylinder and rotatable within a correspondingly shaped cavity in said head, said members having juxtaposed faces, a pressure passage leading from the combustion chamber to the space between said faces, means for drivingly connecting said members while permitting relative axial movement thereof, and means connected to said valve driving member for rotating the same while permitting relative axial movement of said member and means.

17. In an internal combustion engine having a cylinder and a cylinder head, a valve member having tapering side walls converging toward the cylinder and rotatable within a seat formed by a correspondingly shaped cavity in said head, said member having a combustion chamber opening axially into the cylinder, a valve driving member positioned at the outer end of the valve and having tapering side walls diverging toward the cylinder and rotatable within a correspondingly shaped cavity in said head, said members having juxtaposed marginal faces, a pressure passage leading from the combustion chamber to the space between said faces, and means located inwardly of said faces for drivingly connecting said members while permitting relative axial movement thereof.

18. In an internal combustion engine having a cylinder and a cylinder head, a valve member having tapering side walls converging toward the cylinder and rotatable within a seat formed by a correspondingly shaped cavity in said head, said member having a combustion chamber opening into the cylinder, a valve driving member positioned at the outer end of the valve and having tapering side walls diverging toward the cylinder and rotatable within a correspondingly shaped cavity in said head, said members having juxtaposed faces, a pressure passage leading from the combustion chamber to the space between said faces, means for drivingly connecting said members while permitting relative axial movement thereof, and yielding means urging said valve member toward its seat and relatively to said driving member.

19. In an internal combustion engine having a cylinder, a pair of rotatable generally frustoconically shaped inner and outer valve members drivingly connected together and axially movable with respect to each other, means for urging the inner member toward the cylinder, and means for urging the other member away from the cylinder, one member having a combustion space communicating by means of a port with the cylinder.

20. In an internal combustion engine having a cylinder and a reciprocable piston therein, a cylinder head, a two part rotatable valve in said head, one part having a combustion chamber and said parts having opposed faces extending closely adjacent each other, a communicating duct leading from said combustion chamber to the space between said surfaces, the other part having a stem, and a gear drivingly connected to said stem.

21. In an internal combustion engine having a cylinder head, a rotatable valve in said head comprising two members drivingly connected together and separable in a direction axially of the valve, one of said members having a combustion chamber and a duct effecting communication between said chamber and the space between adjacent surfaces of said members, the other member having a stem, and a gear drivingly connected to said stem.

22. In an internal combustion engine having a cylinder head, a rotatable valve in said head comprising two members drivingly connected together and separable in a direction axially of the valve, one of said members having a combustion chamber and a duct effecting communication between said chamber and the space between said members, the other member having a hollow stem, a gear drivingly connected to said stem, and a compression spring within said stem coacting with the first named member.

23. In an internal combustion engine having a cylinder and a reciprocable piston therein, a cylinder head, a two part rotatable valve in said head, one part having a combustion chamber, a communicating duct leading from said combustion chamber to the space between adjacent walls of the two parts of the valve, the other part having a hollow axially extending stem, driving means connected to said stem, and a compression spring in said stem coacting with the first named valve part.

24. In an internal combustion engine having a cylinder head, a rotatable valve in said head comprising two members drivingly connected together and separable in a direction axially of the valve, one of said members having a combustion chamber and a duct effecting communication between said chamber and the space between said members, the other member having a hollow stem, a gear drivingly connected to said stem, and a compression spring within said stem coacting with the first named member.

25. In an internal combustion engine having a cylinder and a cylinder head, a rotary valve comprising inner and outer valve members, the inner member having walls converging toward the cylinder and provided with a combustion chamber opening into the cylinder, means for drivingly connecting said members together while permitting relative axial movement thereof, a duct effecting communication between said chamber and the space between said members, the outer member having a hollow stem, and a spring within said stem coacting with said inner member.

26. In an internal combustion engine having a cylinder and a cylinder head, a rotary valve comprising inner and outer valve members, the inner member having walls converging toward the cylinder and provided with a combustion chamber opening into the cylinder, the outer member having walls diverging toward the cylinder, means for drivingly connecting said members together while permitting relative axial movement thereof, means for transmitting pressure from the combustion chamber to the bottom of said outer valve member, the outer member having a hollow stem, and a spring within said stem coacting with said inner member.

27. In an internal combustion engine having a cylinder, a rotatable valve having a combustion chamber and side walls converging toward the cylinder, said valve being double-walled to provide a chamber extending around said combustion chamber, a screw plug closing the outer end of the chamber, a driving member for said valve, and a spring interposed between the driving member and said plug.

28. In an internal combustion engine having a cylinder, a rotatable valve having a combustion chamber and side walls converging toward the cylinder, said valve being double-walled to provide a chamber extending around said combustion chamber, a screw plug closing the outer end of the chamber, a driving member for said valve having a splined connection with said valve outwardly of said plug, means for urging said driving member away from the valve, and means for urging the valve toward the cylinder.

29. In an internal combustion engine, a rotatable valve formed with a combustion chamber having the major portion thereof in the valve and lying at one side of the axis of rotation, a member drivingly connected to said valve, and a duct for transmitting pressure from the combustion chamber to said member and located at the aforesaid side of the said axis.

30. In an internal combustion engine, a rotatable valve formed with a combustion chamber and a port in the side of the valve at one side of its axis of rotation communicating with said chamber, means for driving said valve, and a duct transmitting pressure from the combustion chamber to said means and located at the aforesaid side of said axis.

LA VERNE B. RAGSDALE.

CERTIFICATE OF CORRECTION.

December 12, 1944.

Patent No. 2,364,658.

LA VERNE B. RAGSDALE.

It is hereby certified that error appears in the printed specification of the above numbered patent requiring correction as follows: Page 4, first column, line 13, claim 2, after the syllable "tween" strike out the words "walls of" and insert the same before "said" first occurrence in line 14, same claim; and that the said Letters Patent should be read with this correction therein that the same may conform to the record or the case in the Patent Office.

Signed and sealed this 8th day of May, A. D. 1945.

Leslie Frazer

Acting Commissioner of Patents.

(Seal)

bustion chamber, a screw plug closing the outer end of the chamber, a driving member for said valve, and a spring interposed between the driving member and said plug.

28. In an internal combustion engine having a cylinder, a rotatable valve having a combustion chamber and side walls converging toward the cylinder, said valve being double-walled to provide a chamber extending around said combustion chamber, a screw plug closing the outer end of the chamber, a driving member for said valve having a splined connection with said valve outwardly of said plug, means for urging said driving member away from the valve, and means for urging the valve toward the cylinder.

29. In an internal combustion engine, a rotatable valve formed with a combustion chamber having the major portion thereof in the valve and lying at one side of the axis of rotation, a member drivingly connected to said valve, and a duct for transmitting pressure from the combustion chamber to said member and located at the aforesaid side of the said axis.

30. In an internal combustion engine, a rotatable valve formed with a combustion chamber and a port in the side of the valve at one side of its axis of rotation communicating with said chamber, means for driving said valve, and a duct transmitting pressure from the combustion chamber to said means and located at the aforesaid side of said axis.

LA VERNE B. RAGSDALE.

CERTIFICATE OF CORRECTION.

December 12, 1944.

Patent No. 2,364,658.

LA VERNE B. RAGSDALE.

It is hereby certified that error appears in the printed specification of the above numbered patent requiring correction as follows: Page 4, first column, line 13, claim 2, after the syllable "tween" strike out the words "walls of" and insert the same before "said" first occurrence in line 14, same claim; and that the said Letters Patent should be read with this correction therein that the same may conform to the record or the case in the Patent Office.

Signed and sealed this 8th day of May, A. D. 1945.

Leslie Frazer

Acting Commissioner of Patents.

(Seal)